United States Patent [19]

Kückens et al.

[11] Patent Number: 4,689,067

[45] Date of Patent: Aug. 25, 1987

[54] METHOD FOR QUALITATIVELY AND QUANTITATIVELY IMPROVING THE FERTILIZING OR LEAF DRESSING OF CULTIVATED AND ORNAMENTAL PLANTS IN GREENHOUSES, OUTDOORS OR AGRICULTURE

[75] Inventors: Alexander Kückens, Gross Grönau; Horst Köhl, Bad Oldesloe, both of Fed. Rep. of Germany

[73] Assignee: Technica Entwicklungsgesellschaft mbH & Co. KG, Ratzeburg, Fed. Rep. of Germany

[21] Appl. No.: 803,575

[22] Filed: Dec. 2, 1985

[30] Foreign Application Priority Data

Dec. 3, 1984 [DE] Fed. Rep. of Germany ....... 3444014
Feb. 4, 1985 [DE] Fed. Rep. of Germany ....... 3503710

[51] Int. Cl.$^4$ ................................................ C05G 3/02
[52] U.S. Cl. ............................................. 71/3; 71/65; 71/79; 71/1; 71/64.1
[58] Field of Search .................... 71/1, 15, 64.1, 3, 65, 71/79

[56] References Cited

U.S. PATENT DOCUMENTS

| 3,197,302 | 7/1965 | MacBride | 71/37 |
| 3,532,485 | 10/1970 | Stevens | 71/1 |
| 3,647,411 | 3/1972 | Stevens | 71/1 |

*Primary Examiner*—Ferris H. Lander
*Attorney, Agent, or Firm*—Karl F. Ross; Herbert Dubno

[57] ABSTRACT

A method of qualitatively and quantitatively improving the fertilization of plants comprising impregnating a plant nutrient salt solution, optionally containing herbicides, fungicides or insecticides, with an amount of $CO_2$ effective to economically increase the solubility of said nutrient salt whereby the quantitative uptake through the surface is improved.

4 Claims, No Drawings

METHOD FOR QUALITATIVELY AND QUANTITATIVELY IMPROVING THE FERTILIZING OR LEAF DRESSING OF CULTIVATED AND ORNAMENTAL PLANTS IN GREENHOUSES, OUTDOORS OR AGRICULTURE

CROSS REFERENCE TO RELATED APPLICATION

This application is related to Ser. No. 642,031 filed Aug. 17, 1984.

FIELD OF THE INVENTION

This invention relates to a method of qualitatively and quantitatively improving the fertilizing or leaf dressing of cultivated and ornamental plants in greenhouses, outdoors or in agriculture, comprising the steps of preparing an aqueous solution enriched with nutrients, herbicides or pesticides and directly spraying or aerosolizing the same on the leaves of the useful and/or ornamental plants through nozzle systems.

BACKGROUND OF THE INVENTION

In closed greenhouses, the irrigation water is known to be enriched with carbon dioxide gas to enhance both the growth and resistance of the plants to diseases and pests by influencing the quality of the soil. One of the known irrigation systems may be employed for introducing the water impregnated with carbon dioxide into the soil, such as, for example, the drip irrigation system, the channel irrigation system, the catchment type irrigation system and the rain gun type irrigation system. For the introduction of the water enriched with $CO_2$ into the soil, it is essential that the absorptivity for $CO_2$ in water should be increased above the normal absorbing capacity and that a fine impregnation should be achieved, which prevents free bubbles in the irrigation water from impairing or blocking the supply-, dosing- and nozzle systems or the like.

Owing to the high degree of impregnation, the spraying or aerosolizing of the so high and fine impregnated irrigation water results in losses in $CO_2$ already upon the discharge of the irrigation water and consequently, renders these types of irrigation system less economical.

On the other hand, the spraying of irrigation water has gained importance for so-called leaf dressing or fertilizing. In leaf dressing, one utilizes the capability of the plants to directly take up nutrients through the leaves and sprays nutrient solutions, to which fungicides or other pesticides may be also added, directly on the plants leaves. In doing so, difficulties often arise due to the fact that the fine supply and nozzle areas of the nozzle system are impaired or clogged by deposits of the dissolved nutrients, herbicides or pesticides. Hence, these systems require continuous maintenance and cleaning. Another disadvantage is to be seen in the deposits and spots formed on the plant surface. Moreover, when this system is used, the substances are to be converted to a compound, for example, a chelate, adapted to be better taken up by the plants, a fact that makes the method more expensive and impedes its large scale employment.

OBJECT OF THE INVENTION

It is an object of the present invention to improve this leaf dressing method by increasing the reliability of the nozzle systems and by improving both quantitatively and qualitatively the nutrient uptake through the leaves, with deposits on the plant surface being largely avoided.

SUMMARY OF THE INVENTION

This object is achieved in that the aqueous solution or the water used for producing said solution is impregnated with $CO_2$ gas up to a content that ranges within the natural absorbing capacity of water for $CO_2$ gas at ambient temperature and at atmospheric pressure or is slightly greater.

The method makes use of the capability of the plants leaves to directly absorb both macro- and micro nutrients and supply the same to the metabolism of the plant. This nutrient uptake through the leaves may substantially be enhanced and favored by adding—in accordance with the new method—to the nutrient solution or to the irrigation water used for the production of the nutrient solution, carbon dioxide gas in quantities that amount to or slightly exceed the normal absorbing capacity of the water at ambient temperature. The normal absorbing capacity for carbon dioxide gas in water having a temperature of approximately $+20°$ C. is about 0.88 l gas/l pure water, approximately corresponding to 1.78 g of $CO_2$ per liter water. Since the normal tap water already contains foreign gases or other foreign matter, in practice, the normal absorbing capacity is lower than the given value. Increasing the $CO_2$ content above the normal value will result in a substantial increase in the solubility of the water for the nutrient salts. Consequently, when the water is impregnated with $CO_2$ the nutrient salts will not so easily crystallize out of the nutrient solution or deposit in a different manner and therefore, any clogging of the conduits and nozzles of the nozzle or spraying system and of the plants take-up organs is largely excluded. Hence, the systems need not be maintained so often and the aftertreatment of the plants is also substantially reduced, with the reliability of the spraying system being essentially increased at the same time. It is thereby ensured, that the nutrient solutions can be extraordinarily uniformly placed on the leaves of the useful plants.

Hitherto, the applicability of leaf dressing has been limited. In contrast thereto, acid formation takes place in the direct vicinity of the roots when the soil is fertilized—above all, carbonic acid is formed which causes an increased availability.

Such an acid is formed whenever carbon dioxide, respired by the roots, physically penetrates into the nutrient water. Chemically dissolved carbonic acid is thereby formed at a ratio of 1:1,000 with regard to the physically dissolved carbon dioxide. This acid forms hydrogencarbonates and makes cationic minerals available to the plant.

However, on the leaf surface the plant cannot dispose of such a system. In accordance with the present invention, the water is consequently enriched to some extent with $CO_2$, whereby the quantitative nutrient uptake through the surface is improved. There is also a qualitative improvement to the effect that any detrimental, pore-clogging crystallization or deposit is largely excluded owing to the increased solubility. Due to an increased nutrient salt concentration in the dressing water on the leaf surface—caused by the impregnation with $CO_2$—a higher osmotic gradient results. Consequently, the plant surface is capable of taking up more nutrients. This increased take-up capacity is also maintained in case $CO_2$ is taken up through the stomata, since the $CO_2$ concentration increases again simultaneously with the evaporation so that the solvency is maintained to a large extent until the evaporation process has terminated.

Since the $CO_2$ content is adjusted to some extent, there are only slight losses in $CO_2$ when the nutrient solution is sprayed. Consequently, when the water spray mist precipitates on the leaves of the plants, the originally adjusted $CO_2$ content is substantially maintained, even in a relatively stable manner, and therefore, the carbon dioxide contained in the water also substantially improves the nutrient uptake of the plants through the leaves, since in this case as well, the solubility of the nutrient salts in water is greater than in non-impregnated water owing to the carbon dioxide content. Accordingly, upon evaporation of the water mist falling on the leaves, the carbon dioxide is gradually released and can be directly taken up by the stomata of the plants. Losses in $CO_2$ are extremely slight, because the release of the carbon dioxide gas from the nutrient solution takes place directly adjacent to the stomata and is further accomplished in quantities dosed in response to the degree of water evaporation, with the gas concentration increasing above the limit of the natural bond. Hence, the irrigation water drips act as $CO_2$ dispensers available on call. The plants are thus enabled to directly take up and utilize up to 90% or more of the nutrients.

It will be advantageous if the $CO_2$ content of the solution and water, respectively, is selected such that an increased solubility of the water for nutrient salts results in a way as to exclude any depositing of the dissolved substances throughout the entire supply system as well.

It will be expedient if the $CO_2$ content is adjusted between 0.5 and 2 g/l water. Advantageously, the content may be reduced up to 0.1 g/l.

The water qualities differing nowadays with regard to carbon dioxide, are to be taken into account in this connection. Irrigation or dressing water is generally gained from rain or tap water or from a mixture thereof, partly also from surface or ground water, gained from rain as well.

Nowadays, rain has a relatively low carbon dioxide content though the concentration in the atmosphere has seriously increased in the course of the last century. This is due to the fact, that the absorptive power of a condensate is generally higher with regard to sulphur dioxide—at equal atmospheric bonds and at a temperature of about 20° C.—absorptivity amounts to about 40 l $SO_2$ per liter water compared to 0.88 l $CO_2$. $CO_2$ is also liberated from the tap water for technological reasons (protection against corrosion), which means, the content is extremely reduced (viz. German magazine "Bild der Wissenschaft", No. 11/84 "on the formation of mineral water", especially, page 52). This article simultaneously emphasizes the high solvency of the carbonic acid to which the same importance is attached in botany for the availability to the root. Practical experiments have shown that one of the main reasons for the plant infestation today is to be seen in a $CO_2$— and $H_2CO_3$ deficiency. Carbonic acid has a germ-inhibitory effect. The quality of mineral water, for example, is thus naturally preserved.

The reflections on plants in this connection are also applicable to the take-up of minerals and the like for animals and human beings.

The following, essential advantages of the new method are to be emphasized:

Owing to the increased $CO_2$ content, the solubility of the water for the nutrient salts and consequently, the nutrient uptake directly through the leaves of the plants is substantially improved.

Simultaneously with the impregnated nutrient solution, the leaves and the plants are supplied, via the stomata, with $CO_2$ required by the plants for assimilation. The fact is, that $CO_2$ is supplied in dosed quantities and thus, the method can be deemed extremely economical. It is the particularly distinctive characteristic of $CO_2$—the capability of passing through the cell membranes with less difficulty than most of the other substances—that is utilized in this connection. Moreover, $CO_2$ reaches all tissue substances.

When a nutrient solution impregnated with $CO_2$ is employed, the use of fungicides or other pesticides may be substantially reduced, since $CO_2$ has a germ inhibitory effect and also heightens the resistance of the plants. Savings of about 50% or more may be attained.

Deposits and incrustations in the conduits and spraying system are excluded due to the increased $CO_2$ content in the nutrient solution, the same applies to pore clogging and spotting due to deposits on the leaf surface.

Compared to the conventional atmosphere dressing by introducing $CO_2$ gas into the greenhouse atmosphere, the losses in $CO_2$ are extraordinarily slight so that the method can be accomplished in a particular economical manner.

In the nutrient solution settled on the leaves, $CO_2$ is buffered and only gradually made available to the stomata of the plants in the course of the evaporation of the liquid.

Upon large scale employment of the method, the costs may be further substantially reduced by fine impregnating the water with $CO_2$ gained from the recovery of exhaust gases, in particular, flue gases, for example, from power plants, and having only a technical purity, which means, a percentage purity of about or less than 99.5%. The method can thus be also employed in the open field in agriculture.

Due to the fact that technically pure $CO_2$ gained from flue gases is used, the $CO_2$ concentration in the troposphere, which negatively influences the climate, is reduced at the same time. Pesticides can be largely dispensed with when the new method is employed or, at least, the quantities used can be substantially reduced.

Furthermore, economy is increased by the new technology owing to the fact that it will be possible to more selectively adjust the fertilizer to the actual needs of the plants and consequently, fertilizers can be also saved.

It is further known, that the high quantities of fertilizers nowadays employed in agriculture cause increasing loads to the ground water. On the one hand, this is substantially due to the fact that the plants are not capable of completely utilizing the nutrients artificially introduced into the soil and, on the other hand, that the soil itself cannot maintain the high nutrient concentrations. Hence, the nutrients, in particular, nitrogen compounds, are flushed into the ground water in an uncontrolled manner. The new method of leaf dressing disclosed hereinbefore, serves to largely exclude this danger.

In many cases it will not suffice to supply nourishment only by means of leaf dressing. Even better and more favorable conditions for both the plants and ground water will be achieved upon combining the leaf dressing and the fertilization of the soil. Advantageously a combined dressing method of the "splitting type" is employed according to which the aqueous solution impregnated with $CO_2$ and intended to be applied in leaf dressing is substantially enriched with nutrients, herbicides or pesticides loading the ground water, such as nitrogen compounds, trace elements or the like, whereas the remaining nutrients, herbicides or pesticides are either directly or in the form of a nutrient solution introduced into the arable land.

Experiments have shown, that only specific nutrient salts are subject to the danger of being flushed into the ground water. Above all, nitrogen compounds and trace elements are counted among these specific elements.

If the nutrient elements particularly loading the ground water are selectively applied by means of the improved leaf dressing method according to the invention the ground water will remain largely free from these loading substances, since—as depicted hereinbefore—the improved method takes care of a selective and almost complete uptake of the nutrient salts applied by leaf dressing.

The nutrient salts hardly or only slightly loading the ground water can be either directly or separately from the ground water loading substances introduced into the soil in the case of the new method, which means, the substances can be introduced by means of one of the conventional methods, advantageously, however, in the form of a nutrient solution impregnated with $CO_2$, as well. Dressing is thus accomplished by a sort of splitting method, with it being also possible to apply or discharge the nutrient salts directly introduced into the soil in the conventional dry, granular form.

The new splitting method essentially reduces the loads to both the soil and ground water caused by excessive nutrient substances and salts, allows a more selective fertilization and results in essential savings in salt quantities.

The disadvantages of the progressive humus depletion of the soil and its consequences can be compensated in an economical and ecologically reasonable manner by the new method.

In addition, the use of herbicides, fungicides and other insecticides can be drastically reduced with the new method, for example, up to 50% or more, and consequently, the soil and ground water load caused by the substances is reduced to a large extent, as well. It is to be observed that a lot of these substances are hardly degradable or degradation is rather difficult. Besides the quantitative improvement of the nutrient uptake, there is also a qualitative improvement (formation of hydrogencarbonates). The increased absorbing capacity of the plant surface for nutrients is maintained over a relatively long period of time in the case of the new method, since the $CO_2$ concentration in the diminishing water volume is maintained when the water evaporates until the absorption through the surface has terminated. The supply of $CO_2$ and thus of the nutrients is accomplished in dosed quantities.

The increased solubilizing concentration for nutrients caused by the impregnation with $CO_2$ results in an increase in the osmotic pressure on the plant surface. Therefore, the nutrients are capable of better and faster penetrating into the leaf. Owing to the presence of $CO_2$, the permeability is improved as well. Either of the two factors is decisive for an improvement of the surface absorption, with the solutions also reaching the organellae.

We claim:

1. A method of increasing solubility of plant nutrient salts in a solution for promoting plant growth via foliar application of said solution, comprising the steps of:

preparing an aqueous solution of at least one plant-nutrient salt;

impregnating said aqueous solution with carbon dioxide to a carbon dioxide concentration in the water of 0.10 to 2 grams per liter and wherein said concentration is in a range of the normal absorption capacity of the water for the carbon dioxide at ambient temperature and pressure; and dispersing the resulting carbon dioxide impregnated aqueous solution of said plant-nutrient salt primarily on leaves of plants growing at said plant growth site.

2. The method defined in claim 1 wherein said water is initially impregnated with said carbon dioxide to said concentration and at least one compound selected from the group which consists of said nutrient salt, an herbicide and a pesticide is thereafter dissolved in the carbon dioxide impregnated water.

3. The method defined in claim 1 wherein said carbon dioxide is a technical grade carbon dioxide with a $CO_2$ content of less than 99.5% and obtained by carbon dioxide recovery of an industrial plant exhaust gas.

4. The method defined in claim 1 wherein said solution is impregnated with said carbon dioxide after said nutrient salt has been dissolved therein and at least one compound selected from the group which consists of an herbicide and a pesticide is thereafter added to said solution at least by the time said solution is dispersed onto the leaves of said plants.

* * * * *